US008011591B2

(12) United States Patent
Di Iorio

(10) Patent No.: US 8,011,591 B2
(45) Date of Patent: Sep. 6, 2011

(54) MULTI-APPLICATION IC CARD WITH SECURE MANAGEMENT OF APPLICATIONS

(75) Inventor: Paolo Di Iorio, San Nicola La Strada (IT)

(73) Assignee: Incard SA, Geneva (CH)

( * ) Notice: Subject to any disclaimer, the term of this patent is extended or adjusted under 35 U.S.C. 154(b) by 880 days.

(21) Appl. No.: 11/948,565

(22) Filed: Nov. 30, 2007

(65) Prior Publication Data
US 2008/0128515 A1 Jun. 5, 2008

(30) Foreign Application Priority Data

Nov. 30, 2006 (EP) .................................... 06024808

(51) Int. Cl.
G06K 5/00 (2006.01)
G06K 19/06 (2006.01)
(52) U.S. Cl. ........................ 235/492; 235/380
(58) Field of Classification Search .................. 235/379, 235/380, 492, 382, 494; 705/54, 44
See application file for complete search history.

(56) References Cited

U.S. PATENT DOCUMENTS

| 5,586,323 | A * | 12/1996 | Koizumi et al. | ............. | 717/174 |
| 6,430,561 | B1 | 8/2002 | Austel et al. | .................... | 707/9 |
| 2004/0172370 | A1 | 9/2004 | Bidan et al. | ..................... | 705/75 |
| 2004/0199787 | A1 | 10/2004 | Hans et al. | .................... | 713/200 |
| 2004/0260653 | A1* | 12/2004 | Tsuei et al. | ..................... | 705/54 |
| 2005/0108518 | A1* | 5/2005 | Pandya | ........................ | 713/151 |
| 2005/0263588 | A1* | 12/2005 | Babi et al. | ........................ | 235/380 |
| 2007/0204018 | A1* | 8/2007 | Chandra et al. | ............... | 709/223 |
| 2008/0314974 | A1* | 12/2008 | Hulst et al. | .................... | 235/380 |
| 2009/0224041 | A1* | 9/2009 | Takagi | .......................... | 235/436 |
| 2010/0174770 | A1* | 7/2010 | Pandya | ........................ | 709/200 |
| 2010/0252625 | A1* | 10/2010 | Register et al. | ............ | 235/382.5 |

FOREIGN PATENT DOCUMENTS

WO 2006/038106 4/2006

* cited by examiner

Primary Examiner — Thien M Le
(74) Attorney, Agent, or Firm — Lisa K. Jorgenson; Allen, Dyer, Doppelt, Milbrath & Gilchrist, P.A.

(57) ABSTRACT

A multi-application IC card may include a runtime environment for managing executions of a plurality of stored application. Each application may include a set of rules, to be satisfied by their execution, and a corresponding set of reactions, to be taken if the rules are not satisfied. The runtime environment may include security and reaction registers to reference, respectively, the set of rules and reactions associated with the applications. A security policy manager may initialize, for each application, a reference between the security registers and the rules set between the reactions register and the reactions set. Checking the rules set and/or an activation of the reactions set is controlled by the security policy manager through the security registers and reaction registers. The security policy manager may include a registration function for initializing the security and reaction registers. The registration function may be called from the applications or an administrative user.

20 Claims, 2 Drawing Sheets

MULTI-APPLICATION IC CARD WITH SECURE MANAGEMENT OF APPLICATIONS

FIELD OF THE INVENTION

The present invention relates to a multi-application IC card comprising a runtime environment, for managing executions of a plurality of applications stored in the multi-application IC card.

More particularly, the present invention relates to a multi-application IC card wherein the runtime environment allows the execution of an application if a set of rules for the application is satisfied while it locks the execution if such set of rules is violated.

BACKGROUND OF THE INVENTION

As is known, a multi-application IC card is an IC card storing a plurality of applications that provides different purpose services, for example a loyalty application, an identification application, a credit card application, and similar applications. The multi-application IC card is used as a substitute for multiple IC cards, each storing a single application, since it is more comfortably held in a wallet, and at the same time requiring lower costs of updating applications after issuance, as well as decreasing their development and deployment costs.

Moreover, the multi-application IC card allows commercial synergies between partners since each partner provides its own application so that different applications may communicate or share information inside the multi-application IC card, leading to new business opportunities. For example, a multi-application IC card may comprise an electronic purse application, managing an available credit, and a frequent flyer application, representing the fidelity of a client. When the IC card electronic purse application is used to pay for an airline flight, the frequent flyer application may be updated, for example tracking that a new flight has been booked with a specific company. In other words, in a multi-application IC card, sharing of information or interaction between more than one application may occur.

More particularly, an operating system for the multi-application IC card, for example, Java Card, Multos, or Smart Card for Windows, is responsible for managing such interaction between applications, for example, allowing or locking the information sharing.

The operating system comprises a security policy that is a set of rules and practices regulating, protecting, and distributing sensitive information, as well as regulating the interaction between applications. A security violation occurs when a user, or an application, circumvents or defeats the controls of the operating system, in order to obtain unauthorized access to information, regardless of the security policy.

The security policy in a multi-application IC card is more than a simple concatenation of rules related to the correspondent single applications. In fact, the operating system not only manages the IC card applications and their access to resources, like I/O, memory, random number generator, crypto engine, and so on, but also the interactions between applications and their sharing, that depends on the state or the security policy of a single application.

Moreover, the security policy, especially in a multi-application IC card, may be static or dynamic, meaning that the rules defining the security policy may be changed during the lifetime of the IC card. For example, during a first part of the multi-application IC card lifecycle, an application A may provide services to an application B and deny the same services to an application C. In this case the security policy relating to application A specifies that application B may be served, and application C may not be served.

When a new application D needing the services provided by the application A is stored on the multi-application IC card, for example by an issuer, the security policy of the application A should be changed so to enable the application D to use the services provided by A. Moreover, the security policy is defined not only in the operating system, for example, cabled inside its code, but also inside each single application, for example, defining inside the code of an application A, that another application B may be served, while a third application C may not.

A dynamic change of a security policy, for example, due to the introduction of a new application inside the multi-application IC card, involves not only a modification of the operative system but also a modification of the application code of each application included in the multi-application IC card because the security policy is, in part, controlled by the fixed rules of the operating system, and in other parts controlled directly by the applications.

In other words, by an enforcement or modification of application security policies is based on a proprietary approach, depending on application developers, and not on common functions, usable by all the applications stored in the multi-application IC card.

For this reason, dynamic management of the multi-application IC card security policy is very limited as is the reaction to its violation. Also, such a reaction is generally fixed inside the code of each application or inside the operating system and difficult to modify dynamically. Moreover, according to the multi-application IC card currently known, violation reactions may be checked only when the application is in execution, since it depends on a plurality of controls spread into the operating system and into each single application.

It is also worth noting that a multi-application IC card generally involves many participants, for example an issuer, an end user, an application provider, and a card operator, each participant potentially requiring the storing of a specific application. In this way, the security policy often requires modification or updating, in order to build a cooperative optimization usage of the memory, and to correctly regulate data and service sharing between applications.

With reference to FIG. 1, a multi-application IC card is schematically shown, according to a Java Card Security Model based on the Sandbox security model. Applications #3, #4, and #5 cannot interact with each other directly, but only through the Java Card Runtime Environment (JCRE) #1 which can enforce the Java Card Security Policy according to a Java Card Specification.

Object sharing is performed through the JCRE #1 that is a trusted entity providing a mediation function between applications, for example, requesting services and server applications owning server objects. More particularly, the process could be considered in this way: an application, for example, application #3 requests from JCRE #1 the reference to a shared object. JCRE #1 forwards the request together with an identification (ID) of the requesting application to a server application owning the shareable object.

The server application returns to the JCRE the reference to the shareable object only if application #1 has the permission to exploit the requested services. The permission check is implemented at the application level. Once the reference to a shareable interface object is provided to application #1, the owner of the object cannot revoke or modify the access right to the corresponding service. Accordingly, the policy and the reaction to its violation is static, defined by the specification, and cannot be managed at the application level.

SUMMARY OF THE INVENTION

The object of the present invention is to provide a multi-application IC card able to manage the security policy between applications avoiding the spread of controls into each single application and/or inside the operating system, to modify the security policy associated with each application, as well as its automatic testing, independent of the execution of the application. The multi-application IC card also manages the reactions to be taken in case of a violation of a security policy, at the same time enforcing it, and overcoming the limits that currently affect the current multi-application IC cards.

The approach on which the present invention is based, is to provide a multi-application IC card with a runtime environment comprising centralized security means or circuitry able to track the applications, intended to be stored and run on the multi-application IC card, with a corresponding set of rules to be satisfied before application execution, and a set of reactions, to be activated in case of violation of such set of rules. The set of rules and the set of reactions may be encapsulated in specific/modifiable portions of the application, and their monitoring and/or activation being controlled by the security means. A request of modification of a security policy of an application may be managed through a modification of its specific/modifiable portions. The security means and the runtime environment code may be not involved in such a modification.

BRIEF DESCRIPTION OF THE DRAWINGS

Further characteristics and advantages of the method according to the present invention will be apparent from the following description, made with reference to the annexed drawings, given for illustrative and non-limiting purposes.

DETAILED DESCRIPTION OF THE PREFERRED EMBODIMENTS

Figure 1:
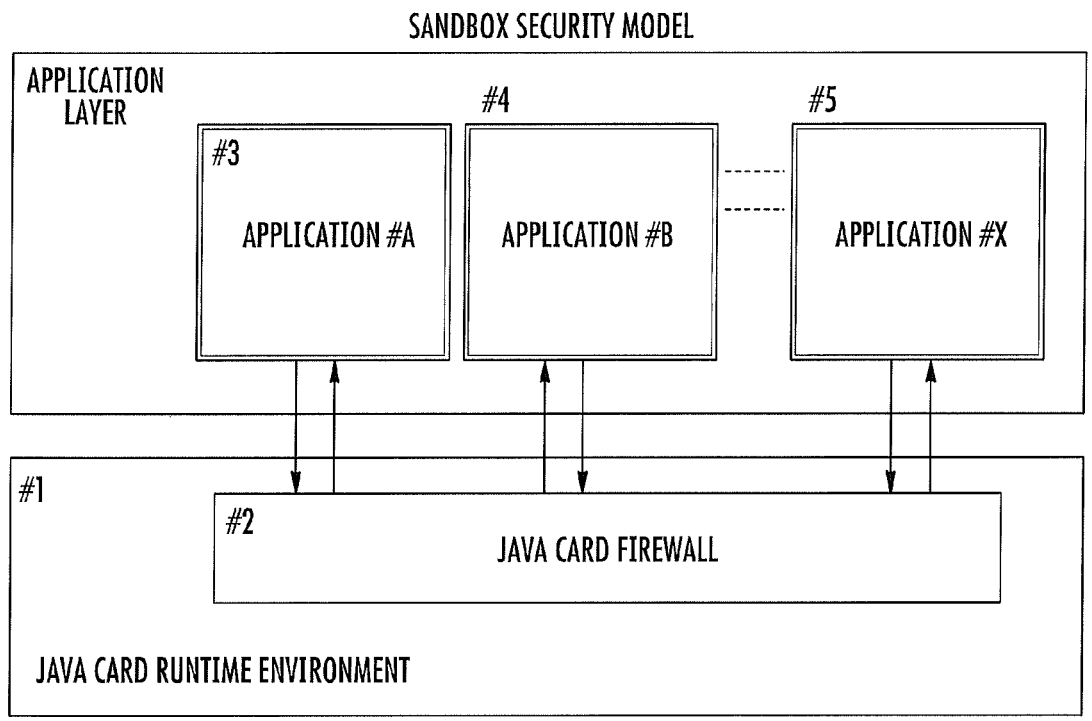
FIG. 1 schematically shows the logic components for implementing security policy in an IC card, according to the prior art.

According to a preferred embodiment a multi-application IC card, schematically represented with reference numeral 10, comprises a runtime environment 1, that is a software bundle including a set of standard class libraries for managing the execution of a plurality of applications #A, #B. More particularly, the runtime environment 1 manages the executions of the applications A, B in order to guarantee their correct interaction, and regulating their possible sharing of information.

Before the execution of an application, the runtime environment 1 checks that a set of rules 6 corresponding to the specific application is satisfied. For example, the set of rules 6 comprises a state variable, representing a runtime environment state, a specific value, stored in memory, and a voltage value or functioning parameters of the multi-application IC card.

Before the execution of an application, if all the rules contained in the set of rules 6 of such application are satisfied, the runtime environment 1 activates the application for execution. Otherwise the application is stopped because the runtime environment 1 interprets the non-satisfaction of the set of rules 6 as a violation of the security of the corresponding application, for example, a non-authorized access to sensitive information. More particularly, if the set of rules 6 for an application is not satisfied, the runtime environment reacts according to a set of reactions 7, associated to the application itself.

The runtime environment 1 comprises a plurality of security registers 4 and a plurality of reaction registers 5 intended to reference, respectively, the set of rules 6 and the set of reactions 7 of the applications. More particularly, the code intended to manage the security condition for the execution of an application, as well as the code intended to manage a reaction against a possible attack, is not spread through the code of the application or through the runtime environment, but enclosed in a specific portion, pointed to by the security registers 4 and reaction registers 5.

The multi-application IC card comprises security means or a security policy manager 3 for initializing, for each application, a reference between the security registers 4 and the set of rules 6. Also, the security policy manager 3 initializes, for each application, a reference between the reactions register 5 and the set of reactions 7.

More particularly, checking of the set of rules 6 and/or an activation of the set of reactions 7, is controlled by the security policy manager 3, respectively through the security registers 4 and reaction registers 5. In this way the set of rules and the set of reactions are associated with the application while their checking and execution are controlled by securing the security policy manager 3 of the runtime environment 1.

A modification of a set of rules 6 during the life cycle of the multi-application IC card, or a modification of the set of reactions 7 impacts a specific portion of the application. The runtime environment is automatically linked to a modified set of rules 6.

The security policy manager 3 comprises a registration function for initializing the security registers 4 and the reaction registers 5. The registration function is invoked by an application intended to be monitored by the security policy manager 3 or by an administrative user charged to profile the set of rules 6 and the corresponding set of reaction 7 for all applications.

More particularly, the set of rules 6 are security objects instanced from a service policy class that includes code for managing a security policy for an application. Also the set of reactions 7 are reaction objects instanced from a reaction class, including code for managing reactions to a violation of the security policy for the applications.

Figure 2:
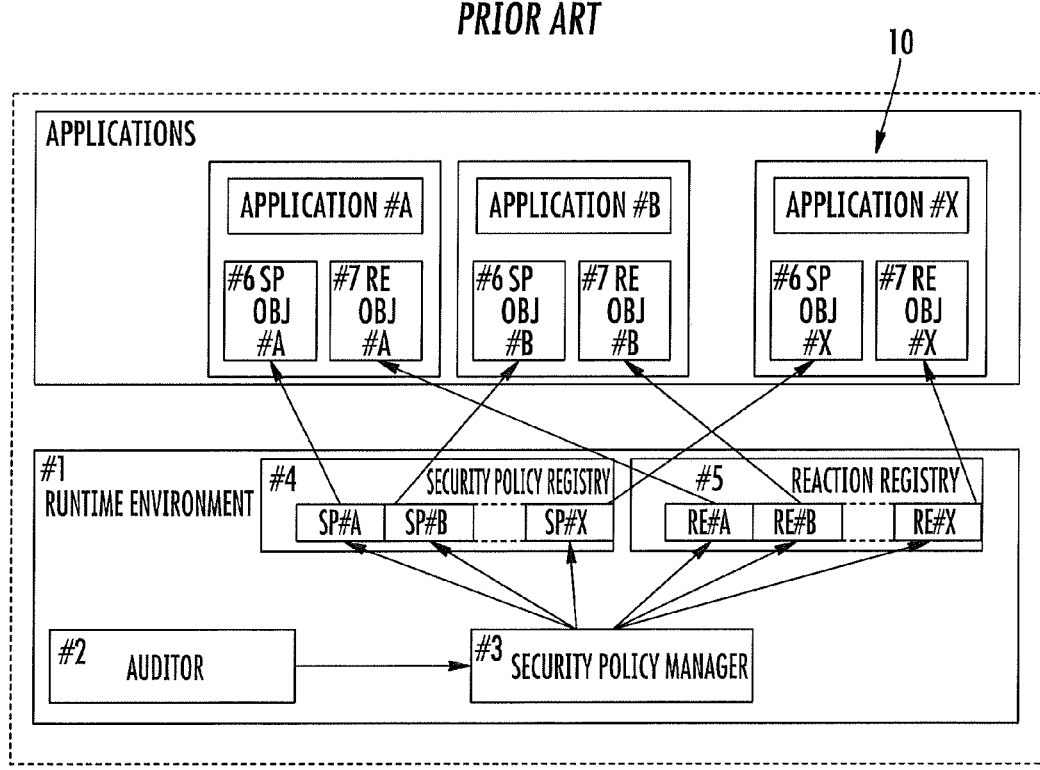
FIG. 2 schematically shows the logic components for implementing the method for managing a security policy for at multi-application IC card according to the present invention.

As schematically shown in FIG. 2, the security registers 4 comprises security policies entries SP#A, SP#B, and SP#X, intended to reference corresponding applications #A, #B, #X.

Each entry inside the security register 4 is intended to be associated with a specific security policy of a corresponding application, and implemented by its set of rules 6 to rule the application and its relationship with other applications of the multi-applications runtime environment 1.

Similarly, the security policy manager 3, access reaction entries RE=A, RE=B, and RE=X, included inside the reaction register 5 of the multi-applications runtime environment 1. Each entry inside the reaction register 5 is intended to be associated to a specific reaction of a corresponding application, and implemented by its set of reactions 7 to rule its behavior in case of violation of the corresponding security policy.

The multi-applications runtime environment 1 also comprises an auditor 2, that is a checking means in charge of asking the security policy manager 3 to check the violation of security policies of application referred by a corresponding entry in the security register 4.

More particularly, each entry inside the security registry 4 stores a reference to a security policy objects 6, and each entry inside the reaction register 5 stores the references to a security reaction object 7.

The security policy object 6 is an instance of a security policy class, that is a set of attributes and functions allowing the definition of rules for the security policies of an application. The security reaction object 7 is an instance of a security reaction class defining the reaction associated to the violation of the security policy defined for an application.

For better understanding in the multiple IC card according to the invention in FIG. 2, a plurality of applications stored inside it are represented and indicated as "Application #A, Application #B, and Application #X". Such applications are loaded into the multi-applications' runtime environment 1 and activated through security policies and corresponding reactions, as described hereafter.

More particularly, the security policy manager 3 provides the definition of a security policy for an application. Each application installed on the multi-application IC card may be registered to a corresponding security policy.

An application, for example, Application #A, queries the security policy manager 3 to activate a service of automatic security surveillance. The security policy manager 3, through a registration function, allows an application to be registered to the automatic security surveillance service.

More particularly, the registration function requires a reference to an instance of a security policy object 6 associated to the application to be supervised, and a reference to an instance of a security reaction object 7 enveloping the action to take if the rule of the security policy object 6 is violated.

With reference to FIG. 2, application #A is associated to a security policy object SP OBJ#A and to a reaction object RE OBJ#7. The entry SP#A in the security register 4 of the multi-application runtime environment 1 is linked to the security policy object SP OBJ#A of application #A, while the entry RE#A in the reaction register 5 is linked to the reaction object RE OBJ#7 of the same application #A.

When application #A is registered to the security surveillance of the security policy manager 3, it is monitored to implement a reaction in case of a violation. More particularly, the registration of applications may be performed directly by the application or by a different entity representing an administrator of applications on the multi-application IC card.

According to the illustrated embodiment, the security policy class provides a set of attributes and a method in order to implement a security policy. More particularly, a security policy object is an instance of a security policy class and comprises the security policy for a specific application, defining the rules regulating the access to application resources and services, and the security operating condition under which the multi-application runtime environment 1 have to operate to host and execute the application.

The security policy object 6 comprises an audit function to verify if the security policy is fulfilled at a certain time. The security reaction object 7 is instantiated by an application from a security reaction class and defines a reaction programmed by the application on the detection of a violation of its security policy. Only an authorized entity may register or modify a security policy on behalf of the application.

According to the illustrated embodiment, the runtime environment 1 provides auditor means or an auditor 2 for requesting the security policy manager 3 to check the security policies for a specific application and ascertain the absence of violation. For example, the auditor 2 may check enforcement of the security policies each time an application requests access to a resource or a service provided by another application. In addition, the auditor 2 may monitor the enforcement of the security policy in order to ascertain the respect of the operative condition for the multi-applicative runtime environment mandated by the applications.

Upon request of the auditor 2, the security policy manager 3 calls the audit function included in security policy objects 6 and referred by the security register 4. Moreover, upon the detection of a security policy violation, the security policy manager 3 calls a react function, included in the relevant reaction object 7, in order to opportunely react to the violation of the security policy object 6. The look up of the relevant instance of the security reaction object 7 is performed through the reaction registry 5, storing the references of all the reaction objects registered.

The react function implements a reaction procedure programmed by the application on the detection of the security violation. Reaction may vary from denying the access to some or all resources, throwing an exception, blocking the application and/or communicating to a local/remote user, or administrating the security violation.

Figure 3:
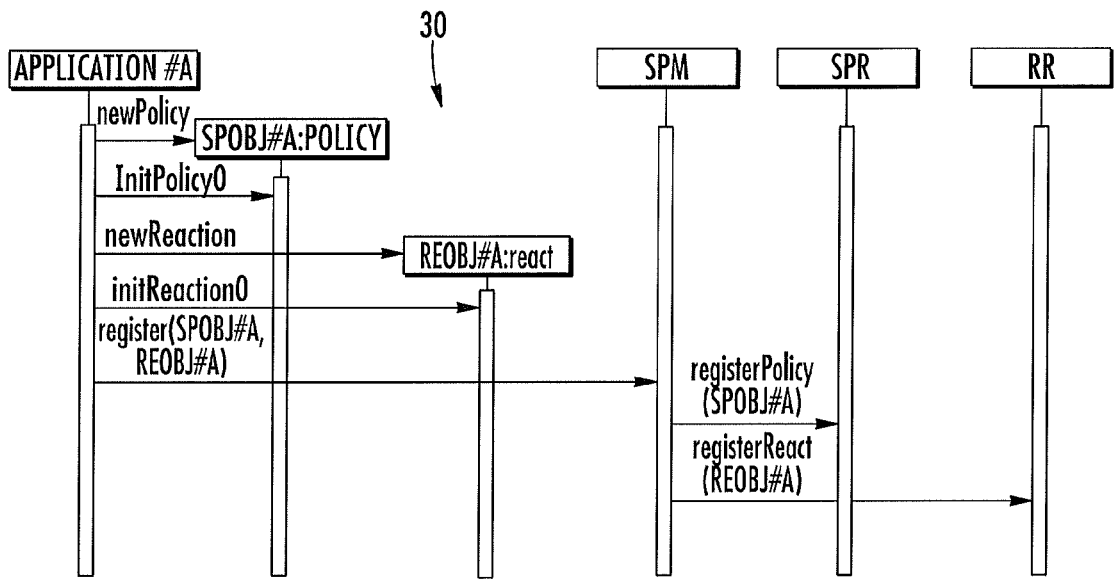
FIG. 3 schematically shows in a block diagram, a registration of an application to the security policy and the registration of the corresponding reaction, according to the present invention.

Now, with reference to FIG. 3, a registration of application to security policy and reaction will be described. More particularly, the sequence diagram 30 describes the registration of a security policy object (SPOBJ#A) and a reaction object (REOBJ#A) to the security policy manager 3 (SPM).

Application #A is executed by the following steps:

creates an instance (newPolicy, newReaction) of the security policy object (SPOBJ#A) and of the reaction object (REOBJ#A);

initializes the two objects according to the security policy and the reaction of the case; and registers (register(SPOBJ#A, REOBJ#A)) the security object SPOBJ#A and the reaction object REOBJ#A to the security policy manager (SPM).

The security policy manager sets the security policy register (SPR) and the reaction register (RR) with the reference provided by the application. At the registering time the security policy manager links the security policy and the reaction to the application registering it.

Advantageously, the multi-application IC card manages and enforces application security according to a specific security policy into a multi-application runtime environment 1. The multi-application IC card defines security policies and correspondent reactions through the instantiation of specific objects, embedded in a simple detectable container, so that the security policy may be specified by the application itself or by the intervention of an application administrator.

The audit of the security policies may be performed automatically by the multi-application runtime environment without requiring the application execution. For example, if an attack is detected by the runtime environment, the auditor 2 alerts the security policy manager 3 to execute checks on the security policy 6 of all registered allocations #A, #B. At each security policy 6 violation, the relevant reaction is performed as recommended by the application #A, #B. In case of attack, an application reacts, for example, by erasing all secret information and/or entering a blocked state that prevents future execution of the application, also in absence of future potential attacks.

For example, the multi-application IC card may manage an application that needs to constantly monitor the status of the multi-application runtime environment 1. If a lack of security is detected, for instance if there is an abnormal working condition due to a de-capsulation of the chip, or to an abnormal voltage or a frequency out of ranges or a velocity check detecting an attack, the multi-application IC card automatically sets up a reaction according to what is defined by the reaction object. The reaction could, for example, put the application into a blocked state, delete the application, or physically erase the memory space of the application, as well as advise a user or an administrator about the security violation.

Advantageously, the multi-application IC card, allows a flexible definition and modification of a security policy. For example, a security policy for an application S may be defined to provide, during the first part of the lifecycle of the multi-application IC card, two different services S1 and S2 to all the other applications stored in the multi-application IC card.

When an issuer of the services S decides to change the policy and to restrict its use, for example, by allowing S1 to be used only by a predefined set of applications whose issuer paid some fee, the security policy may be simply modified, even if such modification was not known in the design phase of application S.

Moreover, the modification of the security policy includes a modification of the security policy object 6 and its corresponding reaction object 7, that are two detectable containers for the code related to the security of the managed application.

Another aspect also relates to a method for managing a multi-application IC card, comprising a runtime environment for executing a plurality of applications, stored in said multi-application IC card.

More particularly, the method comprises the phases for storing, for each application inside the multi-application IC card, a set of rules, to be satisfied for their execution, and a corresponding set of reactions, to be taken if the rules are not satisfied. The method also includes storing, inside security registers and reaction registers the runtime environment, references to the set of rules and to the set of reactions and checking the set of rules and/or activating the set of reactions, with the security registers and reaction registers.

Figure 4:
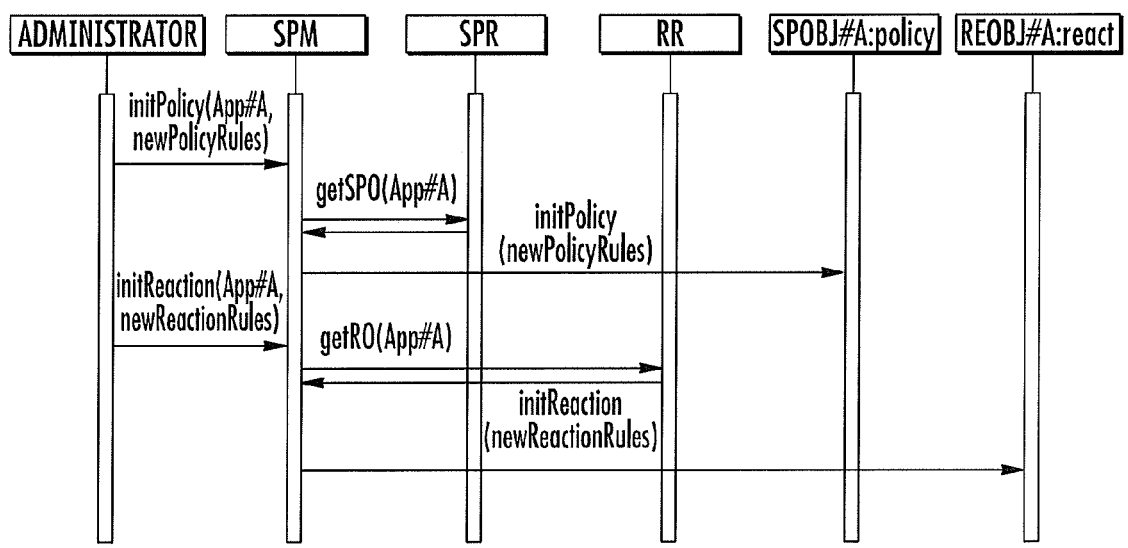
FIG. 4 schematically shows a sequence diagram describing the initialization of a security policy object and a corresponding reaction object, according to the present invention.

According to the method, the runtime environment is responsible to monitor the registers in order to check rules and activate reactions, such rules and reactions are stored inside the application so that their modification does not affect the runtime environment. More particularly, the method provides that the application calls a registration function of the runtime environment for initializing an association between the applications and security registers/reaction registers. The registration function may also be invoked by an administrative or certifier user charged to register all the applications to the multi-application IC card. With reference to FIG. 4, a sequence diagram describing the initialization of a security policy object 6 (SPOBJ#A) and a reaction object 7 (REOBJ#A), performed by an administrator, is schematically shown.

It is assumed in the following that the administrator has been successfully authenticated by the framework. The administrator makes a request to the security policy manager 3 that comprises an execution of a function initPolicy (APP#A, newPolicyRules) and a function InitReaction (App#A, newReactionRules). Such functions initialize the security policy of the application indicated in FIG. 4 with APP#A. The parameters newPolicyRules and newReactionRules describe the new security policy and the new reaction policy.

The security policy manager 3 requests from the security policy registry (SPR), the reference to the security policy object (SPOBJ#A) relevant for the application with identification number APP#A. Moreover, the security policy manager 3 activates the function initPolicy( ) of the object SPOBJ#A, passing the information useful to set up the new security policy. SPOBJ#A parses this information in newPolicyRules and set up the security policy.

According to the step described above, a new reaction may be initialized. The method comprises an instantiation of a plurality of security objects from a security policy class. More particularly, the security class is a template comprising functions and attributes to define a security policy. During the instantiation of a security object for an application, such attributes are set to specific values according to the security policy of the application.

In a same way, the method provides an instantiation of a plurality of reaction objects from a reaction class. The reaction class is a template comprising functions and attributes to define a reaction of an application to a violation. During the instantiation of a reaction object for an application, such attributes are set to specific values according to the reaction to be programmed for the application.

The multi-application IC card and the method of management provides the following advantages:

a common way to manage security policies available for all applications stored in a multi-application IC card;

the security policy for each application is enforced by a centralized trusted environment, providing an advantage in case of a security certification entity;

the security policy manager 3 provides a direct evaluation of the security of all the applications;

automatic auditing of security policies comprising the possibility to check application security even while an application is not in execution;

security policies and reactions may be defined and modified dynamically by the application; and application and security policies/security reactions are not wired into the code included in a distinct item.

That which is claimed is:

1. A multi-application IC card comprising:
a runtime environment for managing executions of a plurality of stored applications, each of the plurality of stored applications comprising a set of rules to be satisfied by its execution and a corresponding set of reactions to be taken if the set of rules are not satisfied;
said runtime environment comprising
a plurality of security registers and a plurality of reaction registers to reference, respectively, the set of rules and the set of reactions, and
a security policy manager to initialize, for the plurality of stored applications, a reference between said plurality of security registers and the set of rules and between said plurality of reactions registers and the set of reactions,
said security policy manager cooperating with said plurality of security registers and said plurality of reaction registers to perform at least one of a checking of the set of rules and an activation of the set of reactions.

2. The multi-application IC card according to claim 1 wherein said security policy manager comprises a registration function to be called by each of the plurality of stored applications to initialize said plurality of security registers and said plurality of reaction registers.

3. The multi-application IC card according to claim 2 wherein the registration function is to be called by an administrative user.

4. The multi-application IC card according to claim 1 wherein the set of rules comprises security objects including code for managing a security policy for the plurality of stored applications.

5. The multi-application IC card according to claim 4 wherein the security objects are generated from a service policy class including functions and attributes for managing security policies.

6. The multi-application IC card according to claim 1 wherein the set of reactions comprises reaction objects including code for managing reactions to a violation of a security policy for the plurality of stored applications.

7. The multi-application IC card according to claim 6 wherein the reaction objects are generated from a reaction class including functions and attributes for managing reactions to violations of security policies.

8. A multi-application IC card comprising:
a runtime environment for managing executions of a plurality of stored applications, each of the plurality of stored applications comprising a set of rules to be satisfied by its execution and a corresponding set of reactions to be taken if the set of rules are not satisfied;
said runtime environment comprising
a plurality of security registers and a plurality of reaction registers to reference, respectively, the set of rules and the set of reactions, and
a security policy manager to initialize, for the plurality of stored applications, a reference between said plurality of security registers and the set of rules and between said plurality of reactions registers and the set of reactions,
said security policy manager cooperating with said plurality of security registers and said plurality of reaction registers to perform a checking of the set of rules and an activation of the set of reactions and comprising a registration function to be called by at least one of the plurality of stored applications to initialize said plurality of security registers and said plurality of reaction registers.

9. The multi-application IC card according to claim 8 wherein the registration function to be called by an administrative user.

10. The multi-application IC card according to claim 8 wherein the set of rules comprises security objects including code for managing a security policy for the plurality of stored applications.

11. The multi-application IC card according to claim 10 wherein the security objects are generated from a service policy class including functions and attributes for managing security policies.

12. The multi-application IC card according to claim 10 wherein the reaction objects are generated from a reaction class including functions and attributes for managing reactions to violations of security policies.

13. The multi-application IC card according to claim 8 wherein the set of reactions comprises reaction objects including code for managing reactions to a violation of a security policy for the plurality of stored applications.

14. A multi-application IC card comprising:
a runtime environment for managing executions of a plurality of stored applications, each of the plurality of stored applications comprising a set of rules to be satisfied by its execution and a corresponding set of reactions to be taken if the set of rules are not satisfied, the set of rules comprising security objects including code for managing a security policy for the plurality of stored applications and the set of reactions comprising reaction objects including code for managing reactions to a violation of the security policy for the plurality of stored applications;
said runtime environment comprising
a plurality of security registers and a plurality of reaction registers to reference, respectively, the set of rules and the set of reactions, and
a security policy manager to initialize, for the plurality of stored applications, a reference between said plurality of security registers and the set of rules and between said plurality of reactions registers and the set of reactions,
said security policy manager cooperating with said plurality of security registers and said plurality of reaction registers to perform at least one of a checking of the set of rules and an activation of the set of reactions.

15. The multi-application IC card according to claim 14 wherein said security policy manager comprises a registration function to be called by each of the plurality of stored applications to initialize said plurality of security registers and said plurality of reaction registers.

16. The multi-application IC card according to claim 15 wherein the registration function to be called by an administrative user.

17. The multi-application IC card according to claim 14 wherein the security objects are generated from a service policy class including functions and attributes for managing security policies and the reaction objects are generated from a reaction class including functions and attributes for managing reactions to violations of the security policies.

18. A method for managing a multi-application IC card, comprising a runtime environment for executing a plurality of stored applications, comprising:
storing, for each of the plurality of stored applications, a set of rules to be satisfied by its execution and a corresponding set of reactions to be taken if the set of rules are not satisfied;
storing references to the set of rules and the set of reactions in a plurality of security registers and a plurality of reaction registers, respectively, in the runtime environment; and
performing at least one of checking the set of rules and activating the set of reactions using the plurality of security registers and the plurality of reaction registers.

19. The method according to claim 18 further comprising storing a registration function inside the runtime environment, the registration function to be called by the plurality of stored applications for initializing the plurality of security registers and the plurality of reaction registers.

20. The method according to claim 19 further comprising generating a plurality of security objects from a security policy class and a reaction class respectively, the plurality of security objects including a code for implementing the set of rules, and a plurality of reaction objects including functions and attributes for managing the set of reactions.

* * * * *

UNITED STATES PATENT AND TRADEMARK OFFICE
CERTIFICATE OF CORRECTION

PATENT NO. : 8,011,591 B2
APPLICATION NO. : 11/948565
DATED : September 6, 2011
INVENTOR(S) : Di Iorio It is certified that error appears in the above-identified patent and that said Letters Patent is hereby corrected as shown below:

| | |
|---|---|
| Abstract, Lines 2-3 | Delete: "application" <br> Insert: --applications-- |
| Column 2, Line 23 | Delete: "by" |
| Column 2, Line 32 | Between "and" and "difficult" insert: --is-- |
| Column 4, Line 50 | Delete: "reaction" <br> Insert: --reactions-- |
| Column 4, Line 59 | Delete: "comprises" <br> Insert: --comprise-- |
| Column 5, Line 13 | Delete: "objects" <br> Insert: --object-- |
| Column 7, Line 9 | Delete: "ranges" <br> Insert: --range-- |
| Column 7, Line 43 | Between "registers" and "the" insert: --for-- |
| Column 8, Line 12 | Delete: "set" <br> Insert: --sets-- |
| Column 8, Line 58 | Delete: "reactions" <br> Insert: --reaction-- |
| Column 9, Line 35 | Delete: "reactions" <br> Insert: --reaction-- |

Signed and Sealed this
Tenth Day of April, 2012

David J. Kappos
*Director of the United States Patent and Trademark Office*

CERTIFICATE OF CORRECTION (continued)
U.S. Pat. No. 8,011,591 B2

| | |
|---|---|
| Column 9, Line 46 | Between "function" and "to" insert: --is-- |
| Column 10, Line 18 | Delete: "and" |
| Column 10, Line 19 | Delete: "reactions"<br>Insert: --reaction-- |
| Column 10, Line 31 | Between "function" and "to" insert: --is-- |